United States Patent
Mollura et al.

(10) Patent No.: US 10,723,083 B2
(45) Date of Patent: Jul. 28, 2020

(54) POLYURETHANE BONDING PROCESS FOR FUEL BLADDERS

(71) Applicant: Vinyl Technology, Inc., Monrovia, CA (US)

(72) Inventors: Dan Mollura, Pasadena, CA (US); Dilip Shukla, Monrovia, CA (US)

(73) Assignee: Vinyl Technology, Inc., Monrovia, CA (US)

( * ) Notice: Subject to any disclaimer, the term of this patent is extended or adjusted under 35 U.S.C. 154(b) by 188 days.

(21) Appl. No.: 15/976,162

(22) Filed: May 10, 2018

(65) Prior Publication Data

US 2018/0326673 A1    Nov. 15, 2018

Related U.S. Application Data

(60) Provisional application No. 62/504,454, filed on May 10, 2017.

(51) Int. Cl.
*B29C 65/52* (2006.01)
*C09J 175/04* (2006.01)
(Continued)

(52) U.S. Cl.
CPC ............ *B29C 65/52* (2013.01); *B29C 65/485* (2013.01); *B29C 66/026* (2013.01);
(Continued)

(58) Field of Classification Search
CPC . B29C 66/742; B29C 66/7422; B29C 66/026; C09J 5/04
See application file for complete search history.

(56) References Cited

U.S. PATENT DOCUMENTS 4,762,900 A * 8/1988 Velasco ................ C08G 18/003
528/52
5,030,515 A * 7/1991 Ozawa .................... B29C 66/71
428/416

(Continued)

FOREIGN PATENT DOCUMENTS

| DE | 10024695 | 11/2001 |
|---|---|---|
| EP | 2439055 | 4/2012 |
| EP | 2772506 | 9/2014 |

*Primary Examiner* — Scott W Dodds
(74) *Attorney, Agent, or Firm* — Sheppard, Mullin, Richter & Hampton LLP (57) ABSTRACT

A method of bonding a metal fitting to a polyurethane structure, the method comprising abrading a surface of the metal fitting with an abrasive; cleaning the metal fitting with a solvent; cleaning a surface of the polyurethane structure with an alcohol; applying a primer to the surface of the metal fitting; applying an adhesive to the surface of the metal fitting and the surface of the polyurethane structure; applying a liquid polyurethane compound to the surface of the metal fitting and the surface of the polyurethane structure; and pressing the surface of the metal fitting against the surface of the polyurethane structure to form an assembly. The primer can comprise a first resin and a first catalyst in a ratio of about 1.1 to 1; the adhesive can comprise a second resin and a second catalyst in a ratio of about 3 to 1; and the liquid polyurethane compound can comprise a third resin and a third catalyst in a ratio of about 10 to 1.

20 Claims, 7 Drawing Sheets

(51) Int. Cl.
    *B29C 65/00*      (2006.01)
    *C08J 5/12*      (2006.01)
    *B29C 65/48*      (2006.01)
    *C08G 18/76*      (2006.01)
    *C09J 5/04*      (2006.01)
    *C09J 5/02*      (2006.01)
    *B29L 22/02*      (2006.01)
    *B29K 705/02*      (2006.01)
    *B29K 675/00*      (2006.01)
    *B29L 31/10*      (2006.01)
    *B29L 31/00*      (2006.01)

(52) U.S. Cl.
CPC ...... *B29C 66/02245* (2013.01); *B29C 66/112* (2013.01); *B29C 66/1122* (2013.01); *B29C 66/131* (2013.01); *B29C 66/472* (2013.01); *B29C 66/47421* (2013.01); *B29C 66/532* (2013.01); *B29C 66/53243* (2013.01); *B29C 66/71* (2013.01); *B29C 66/712* (2013.01); *B29C 66/7422* (2013.01); *C08G 18/7621* (2013.01); *C08G 18/7671* (2013.01); *C08J 5/124* (2013.01); *C09J 5/02* (2013.01); *C09J 5/04* (2013.01); *C09J 175/04* (2013.01); *B29C 65/524* (2013.01); *B29K 2675/00* (2013.01); *B29K 2705/02* (2013.01); *B29L 2022/025* (2013.01); *B29L 2031/10* (2013.01); *B29L 2031/712* (2013.01); *B29L 2031/7172* (2013.01); *B29L 2031/778* (2013.01); *C08J 2375/00* (2013.01); *C08J 2475/00* (2013.01)

(56) References Cited

U.S. PATENT DOCUMENTS

| | | |
|---|---|---|
| 5,755,425 A | 5/1998 | Marolda |
| 2004/0014383 A1* | 1/2004 | Ishino ................... B29C 67/246 442/59 |
| 2009/0090724 A1 | 4/2009 | Childress et al. |
| 2010/0092733 A1 | 4/2010 | Blank |
| 2011/0094598 A1 | 4/2011 | Childress et al. |
| 2014/0238595 A1* | 8/2014 | Blohowiak ............ B29C 65/48 156/281 |
| 2017/0259932 A1 | 9/2017 | Chasen et al. |

* cited by examiner

```
┌─────────────────────────────────────────────────────────────────┐
│ Abrade a first surface of a first metal fitting and a second    │
│ surface of a second metal fitting with an abrasive              │
│                              802                                 │
└─────────────────────────────────────────────────────────────────┘
                                │
                                ▼
┌─────────────────────────────────────────────────────────────────┐
│ Clean the first and second surfaces of the first and second     │
│ metal fittings with a solvent                                    │
│                              804                                 │
└─────────────────────────────────────────────────────────────────┘
                                │
                                ▼
┌─────────────────────────────────────────────────────────────────┐
│ Clean a first surface of a polyurethane structure and a second  │
│ surface of the polyurethane structure with an alcohol           │
│                              806                                 │
└─────────────────────────────────────────────────────────────────┘
                                │
                                ▼
┌─────────────────────────────────────────────────────────────────┐
│ Apply a primer to the first surface of the first metal fitting  │
│ and the second surface of the second metal fitting              │
│                              808                                 │
└─────────────────────────────────────────────────────────────────┘
                                │
                                ▼
┌─────────────────────────────────────────────────────────────────┐
│ Apply an adhesive to the first surface of the first metal       │
│ fitting, the second surface of the second metal fitting, and    │
│ the first and second surfaces of the polyurethane structure     │
│                              810                                 │
└─────────────────────────────────────────────────────────────────┘
                                │
                                ▼
┌─────────────────────────────────────────────────────────────────┐
│ Apply a liquid polyurethane compound to the first surface of    │
│ the first metal fitting, the second surface of the second       │
│ metal fitting, and the first and second surfaces of the         │
│ polyurethane structure                                           │
│                              812                                 │
└─────────────────────────────────────────────────────────────────┘
                                │
                                ▼
┌─────────────────────────────────────────────────────────────────┐
│ Press the first surface of the first metal fitting against the  │
│ first surface of the polyurethane structure and the second      │
│ surface of the second metal fitting against the second surface  │
│ of the polyurethane structure to form an assembly               │
│                              814                                 │
└─────────────────────────────────────────────────────────────────┘
```

FIG. 8

POLYURETHANE BONDING PROCESS FOR FUEL BLADDERS

CROSS-REFERENCE TO RELATED APPLICATION

The present application claims priority to U.S. Provisional Patent Application No. 62/504,454, filed May 10, 2017, the entire contents of which is incorporated into this application by reference.

FIELD OF THE INVENTION

This invention relates generally to a bonding process and, more particularly, to a method of bonding a metal fitting to a polyurethane structure.

BACKGROUND

Fuel bladders can be used to satisfy weight requirements in high-altitude, long-range unmanned aerial vehicles (UAV). The fuel bladders, along with all other elements of the UAV, must be designed to survive the environment in which they operate. Considerations for fuel bladder platforms include climate and thermal management issues. For example, a UAV operating in a desert environment can experience extreme temperature changes—from the high temperatures on the ground to the low temperatures at altitude. Thermal expansion and contraction caused by these extreme temperature changes can create stresses on the flexible materials employed in the fuel bladder.

In the past, these operational stresses have caused leak-paths and other defects to develop near metal fittings on the flexible fuel bladders. It should be appreciated that there is a need for an improved bladder that is configured to withstand the operational stresses of high-altitude, unmanned flight. The present invention fulfills this need and provides other related advantages.

BRIEF SUMMARY OF THE INVENTION

The present invention is embodied in a method of bonding a metal fitting to a polyurethane structure. In one embodiment, the method can comprise abrading a surface of the metal fitting with an abrasive; cleaning the metal fitting with a solvent; cleaning a surface of the polyurethane structure with an alcohol; applying a primer to the surface of the metal fitting; applying an adhesive to the surface of the metal fitting and the surface of the polyurethane structure; applying a liquid polyurethane compound to the surface of the metal fitting and the surface of the polyurethane structure; and pressing the surface of the metal fitting against the surface of the polyurethane structure to form an assembly. The primer can comprise a first resin and a first catalyst in a ratio of about 1.1 to 1; the adhesive can comprise a second resin and a second catalyst in a ratio of about 3 to 1; and the liquid polyurethane compound can comprise a third resin and a third catalyst in a ratio of about 10 to 1.

In one embodiment, the metal fitting can comprise milled aluminum. In another embodiment, the metal fitting can be selected from a group consisting of: a fitting port, a hatch frame, and a ring.

In one embodiment, the pressing step can comprise aligning the surface of the polyurethane structure over the surface of the metal fitting, matching an inner diameter of a die cut hole in the polyurethane structure with an inner diameter of the metal fitting, and pressing the surface of the metal fitting onto the surface of the polyurethane structure.

Each feature or concept outlined above is independent, and can be combined with the other features or concepts outlined above or with any other feature or concept disclosed in this application.

In another embodiment, the method can comprise abrading a first surface of a first metal fitting and a second surface of a second metal fitting with an abrasive; cleaning the first and second metal fittings with a solvent; cleaning a first surface of the polyurethane structure and a second surface of the polyurethane structure with an alcohol; applying a primer to the first surface of the first metal fitting and the second surface of the second metal fitting; applying an adhesive to the first surface of the first metal fitting, the second surface of the second metal fitting, and the first and second surfaces of the polyurethane structure; applying a liquid polyurethane compound to the first surface of the first metal fitting, the second surface of the second metal fitting, and the first and second surfaces of the polyurethane structure; and pressing the first surface of the first metal fitting against the first surface of the polyurethane structure and the second surface of the second metal fitting against the second surface of the polyurethane structure to form an assembly. The primer can comprise a first resin and a first catalyst in a ratio of about 1.1 to 1; the adhesive can comprise a second resin and a second catalyst in a ratio of about 3 to 1; and the liquid polyurethane compound can comprise a third resin and a third catalyst in a ratio of about 10 to 1.

In one embodiment, the first and second metal fittings can comprise milled aluminum. In another embodiment, the first and second metal fittings can be selected from a group consisting of: a fitting port, a hatch frame, and a ring.

In one embodiment, the pressing step can comprise aligning the first surface of the polyurethane structure over the first surface of the first metal fitting, matching an inner diameter of a die cut hole in the polyurethane structure with an inner diameter of the first metal fitting, and pressing the first surface of the first metal fitting onto the first surface of the polyurethane structure.

In one embodiment, the pressing step can further comprise aligning the second surface of the polyurethane structure over the second surface of the second metal fitting, matching the inner diameter of the die cut hole in the polyurethane structure with the inner diameter of the second metal fitting, and pressing the second surface of the second metal fitting onto the second surface of the polyurethane structure.

In one embodiment, the method can further comprise applying the adhesive to an outer perimeter of the assembly. In another embodiment, the method can further comprise applying a bead of the liquid polyurethane compound around the outer perimeter of the assembly. In a further embodiment, the bead can be applied with an air-powered fluid dispenser.

In one embodiment, the polyurethane structure can be a patch. In another embodiment, the method can further comprise heat sealing the patch to a bladder. In a further embodiment, the polyurethane structure can be a bladder. In an additional embodiment, the bladder can be a fuel bladder.

In one embodiment, the abrading can comprise abrasive blasting. In another embodiment, the abrasive can comprise 24 grit aluminum oxide. In a further embodiment, the solvent can comprise methyl ethyl ketone. In an additional embodiment, the method can further comprise allowing the primer to dry for at least 10 minutes. In yet another embodiment, the method can further comprise allowing the adhesive to dry for no more than 10 minutes.

In one embodiment, the first resin can comprise from about 40% to about 70%, by weight, methyl ethyl ketone; from about 10% to about 30%, by weight, isopropyl alcohol; from about 10% to about 30%, by weight, trizinc bis (orthophosphate); from about 1% to about 5%, by weight, phenol; and from about 1% to about 5%, by weight, methanol. In another embodiment, the first catalyst can comprise from about 40% to about 70%, by weight, ethyl acetate; from about 10% to about 30%, by weight, isopropyl alcohol; and from about 1% to about 5%, by weight, phosphoric acid.

In one embodiment, the second resin can comprise from about 50% to about 60%, by weight, methyl ethyl ketone; and from about 15% to about 40%, by weight, bisphenol A diglycidyl ether. In another embodiment, the second catalyst can comprise from about 70% to about 80%, by weight, methyl ethyl ketone; and from about 1% to about 5%, by weight, 4,4-diphenylmethane diisocyanate.

In one embodiment, the third resin can comprise from about 0.1% to about 1%, by weight, toluene diisocyanate. In another embodiment, the third catalyst can comprise from about 65% to about 85%, by weight, di(methylthio)toluenediamine; and from about 15% to about 35%, by weight, glycol ether.

Each feature or concept outlined above is independent, and can be combined with the other features or concepts outlined above or with any other feature or concept disclosed in this application. Other features and advantages of the invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

With reference to FIGS. 1-5 of the illustrative drawings, there is shown various embodiments of an apparatus 100 comprising a metal fitting 10 bonded to a surface 22 of a polyurethane structure 20. In one embodiment, the metal fitting 10 can comprise milled aluminum or milled steel. In another embodiment, the metal fitting 10 can be selected from a group consisting of: a fitting port (e.g., FIG. 1), a hatch frame (e.g., FIG. 2), and a ring (e.g., FIG. 3). In additional embodiments, the metal fitting 10 can further comprise a cap 16 (e.g., FIG. 4) or a nozzle 18 (e.g., FIG. 5). The polyurethane structure 20 can be a bladder 80 (such as a fuel bladder, a water bladder, or an air bladder). Alternatively, the polyurethane structure 20 can be a patch, and the patch can be heat sealed to another polyurethane structure, such as a bladder 80.

Figure 1:
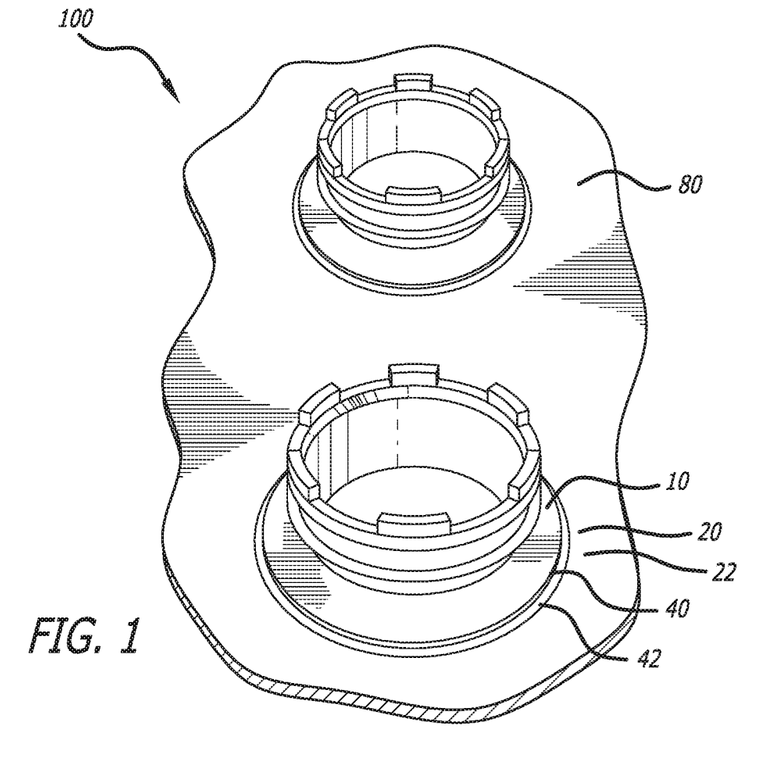
FIG. 1 is a perspective view of a metal fitting port bonded to a surface of a polyurethane structure in accordance with one embodiment.
Figure 2:
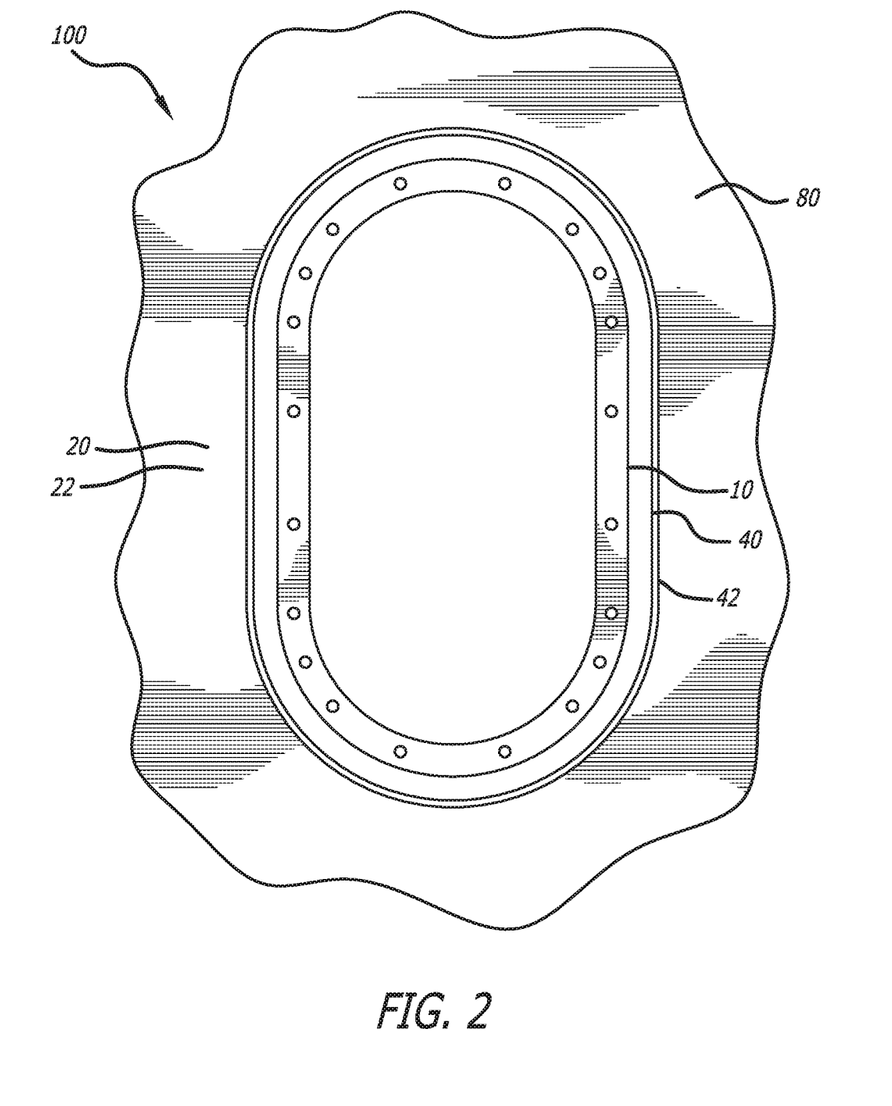
FIG. 2 is a top plan view of a metal hatch frame bonded to a surface of a polyurethane structure in accordance with one embodiment.
Figure 3:
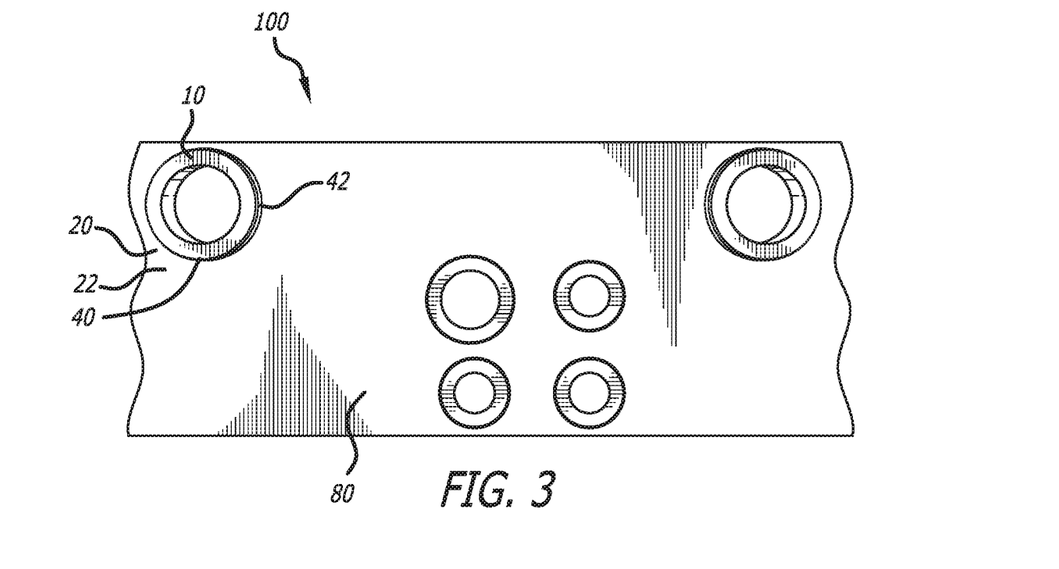
FIG. 3 is a top view of a metal fitting ring bonded to a surface of a polyurethane structure in accordance with one embodiment.
Figure 4:
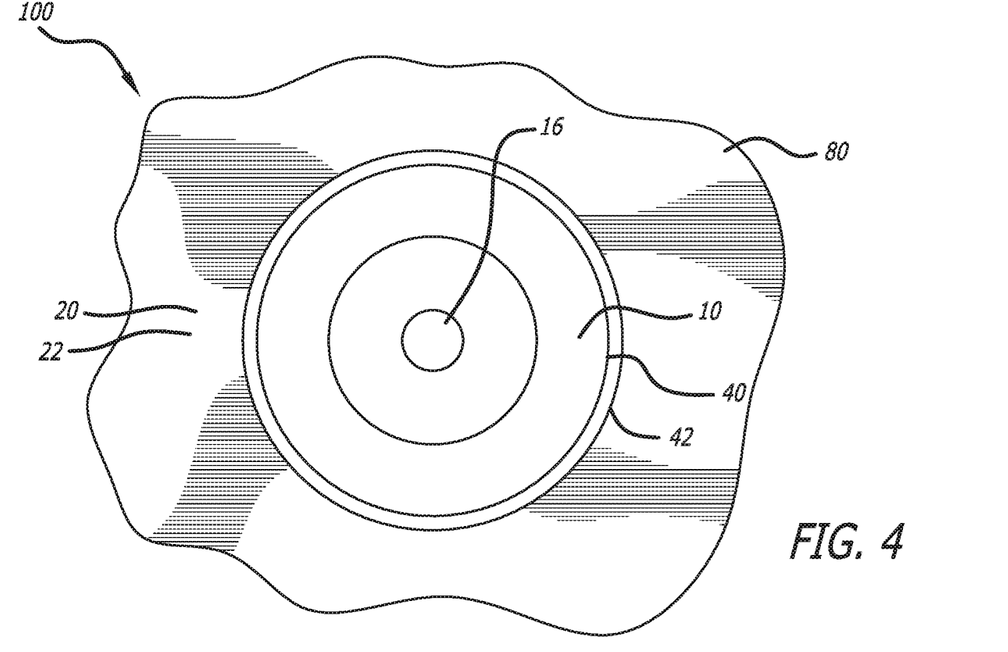
FIG. 4 is a top plan view of a metal fitting bonded to a surface of a polyurethane structure in accordance with one embodiment.
Figure 5:
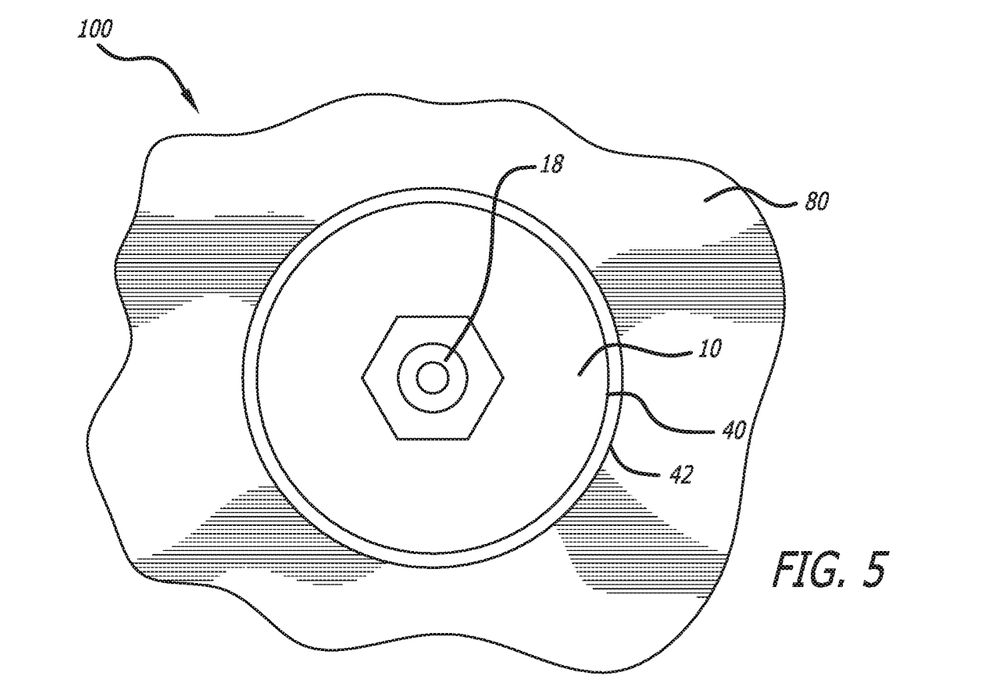
FIG. 5 is a top plan view of a metal fitting bonded to a surface of a polyurethane structure in accordance with one embodiment.
Figure 6:
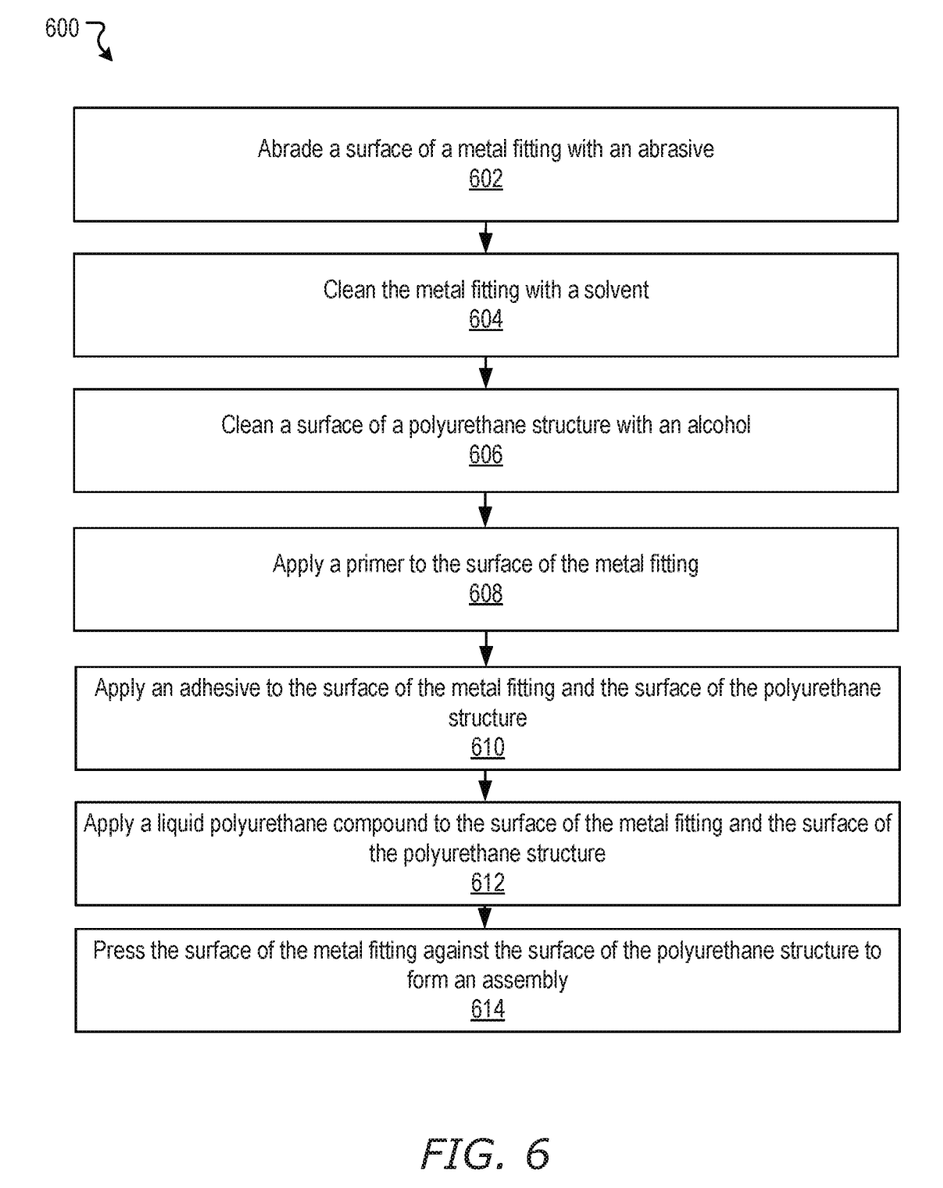
FIG. 6 illustrates an example method of bonding a metal fitting to a polyurethane structure in accordance with one embodiment.

With reference now to FIG. 6, there is shown a method 600 of bonding the metal fitting 10 to the polyurethane structure 20. At block 602, the method can comprise abrading the surface 12 of the metal fitting 10 with an abrasive. In one embodiment, the abrading 602 can comprise abrasive blasting. In another embodiment, the abrasive can comprise 24 grit aluminum oxide. In a further embodiment, the abrading 602 can comprise masking the metal fitting 10 with tape to cover areas of the fitting that are not to be abraded.

At block 604, the method 600 can comprise cleaning the ablated metal fitting 10 with a solvent such as methyl ethyl ketone ("MEK"). For example, after the metal fitting 10 is ablated, the metal fitting 10 can be brushed with MEK to remove loose particles from the ablated metal fitting 10. In one embodiment, the metal fitting 10 can be dipped in MEK for about 3-5 minutes and then dried with a clean cloth.

At block 606, the method 600 can comprise cleaning the surface 22 of the polyurethane structure 20 with an alcohol to remove contaminates.

At block 608, the method 600 can comprise applying a primer 50 to the cleaned and ablated surface 12 of the metal fitting 10. In one embodiment, the primer 50 can comprise a first resin and a first catalyst in a ratio of about 1.1 to 1. In another embodiment, the first resin can comprise from about 40% to about 70%, by weight, methyl ethyl ketone; from about 10% to about 30%, by weight, isopropyl alcohol; from about 10% to about 30%, by weight, trizinc bis(orthophosphate); from about 1% to about 5%, by weight, phenol; and from about 1% to about 5%, by weight, methanol. In a further embodiment, the first catalyst can comprise from about 40% to about 70%, by weight, ethyl acetate; from about 10% to about 30%, by weight, isopropyl alcohol; and from about 1% to about 5%, by weight, phosphoric acid. In an additional embodiment, the first resin and the first catalyst can be mixed thoroughly in a container and then brushed on to the cleaned and ablated surface 12 of the metal fitting 10. In yet another embodiment, the method can further comprise allowing the primer 50 to dry for at least 10 minutes.

At block 610, the method 600 can comprise applying an adhesive 60 to the primed, cleaned, and ablated surface 12 of the metal fitting 10 and the cleaned surface 22 of the polyurethane structure 20. In one embodiment, the adhesive 60 can comprise a second resin and a second catalyst in a ratio of about 3 to 1. In another embodiment, the second resin can comprise from about 50% to about 60%, by weight, methyl ethyl ketone; and from about 15% to about 40%, by weight, bisphenol A diglycidyl ether. In a further embodiment, the second catalyst can comprise from about 70% to about 80%, by weight, methyl ethyl ketone; and from about 1% to about 5%, by weight, 4,4-diphenylmethane diisocyanate. In an additional embodiment, the second resin and the second catalyst can be mixed thoroughly in a container and then brushed on to the primed, cleaned, and ablated surface 12 of the metal fitting 10, as well as the cleaned surface 22 of the polyurethane structure 20. In yet another embodiment, the method can further comprise allowing the adhesive 60 to dry for no more than 10 minutes.

At block 612, the method 600 can comprise applying a liquid polyurethane compound 70 to the surface 12 of the metal fitting 10 and the surface 22 of the polyurethane structure 20. In one embodiment, the liquid polyurethane compound 70 can comprise a third resin and a third catalyst in a ratio of about 10 to 1. In another embodiment, the third resin can comprise from about 0.1% to about 1%, by weight, toluene diisocyanate. In a further embodiment, the third catalyst can comprise from about 65% to about 85%, by weight, di(methylthio)toluenediamine; and from about 15% to about 35%, by weight, glycol ether. In an additional embodiment, the third resin and the third catalyst can be mixed thoroughly in a container and then brushed on to the surface 12 of the metal fitting 10 and the surface 22 of the polyurethane structure 20. In yet another embodiment, the liquid polyurethane compound 70 can be applied to the surface 12 of the metal fitting 10 and the surface 22 of the polyurethane structure 20 while the surfaces 12, 22 remain tacky from the adhesive 60.

At block 614, the method 600 can comprise, pressing the surface 12 of the metal fitting 10 against the surface 22 of the polyurethane structure 20 to form an assembly 100. With reference to FIG. 7C, in one embodiment, the pressing step 614 can comprise aligning the surface 22 of the polyurethane structure 20 over the surface 12 of the metal fitting 10, matching an inner diameter 28 of a die cut hole 26 in the polyurethane structure 20 with an inner diameter 14 of the metal fitting 10, and pressing the surface 12 of the metal fitting 10 onto the surface 22 of the polyurethane structure 20.

Figure 7A:
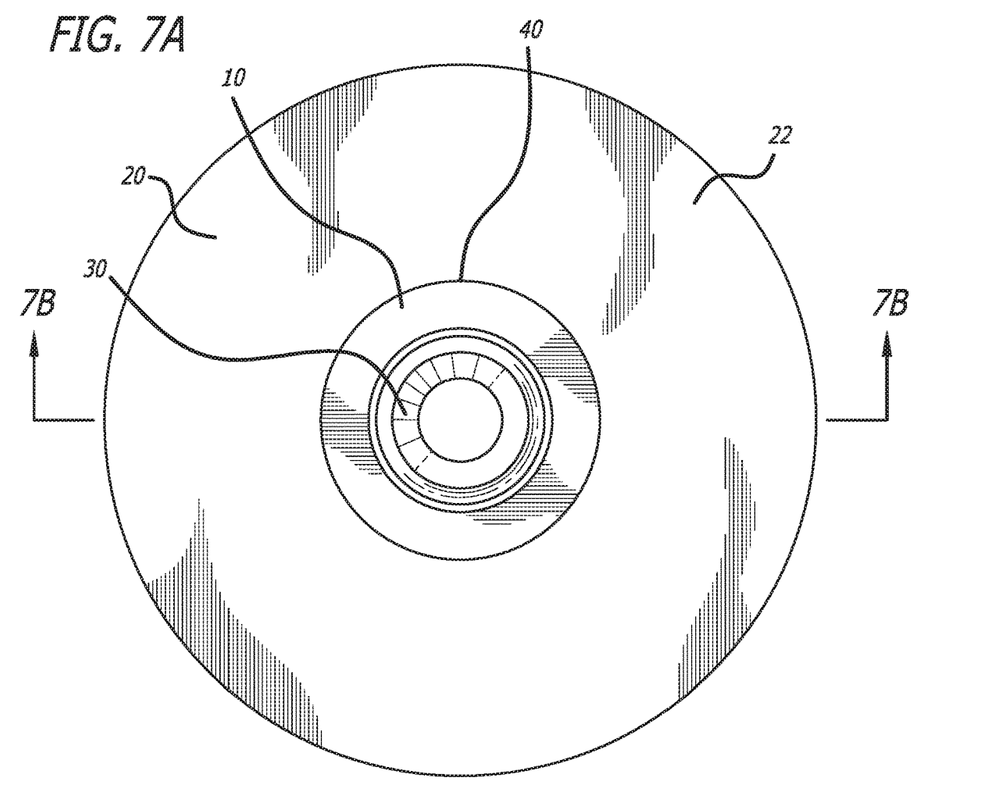
FIG. 7A is a top plan view of metal fittings bonded to a polyurethane structure in accordance with one embodiment.
Figure 7B:
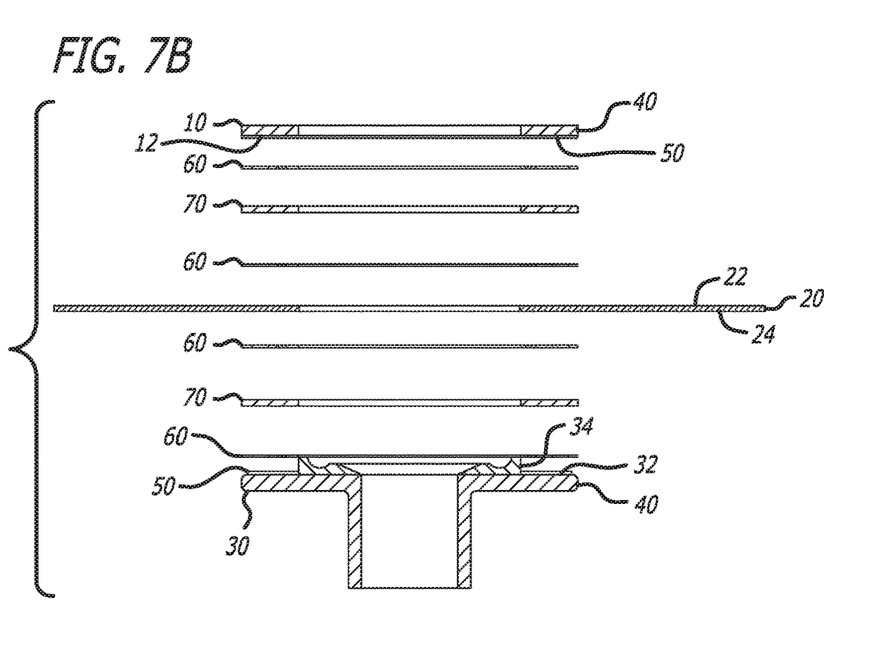
FIG. 7B is an exploded, side-elevational view of a cross section of FIG. 7A.
Figure 7C:
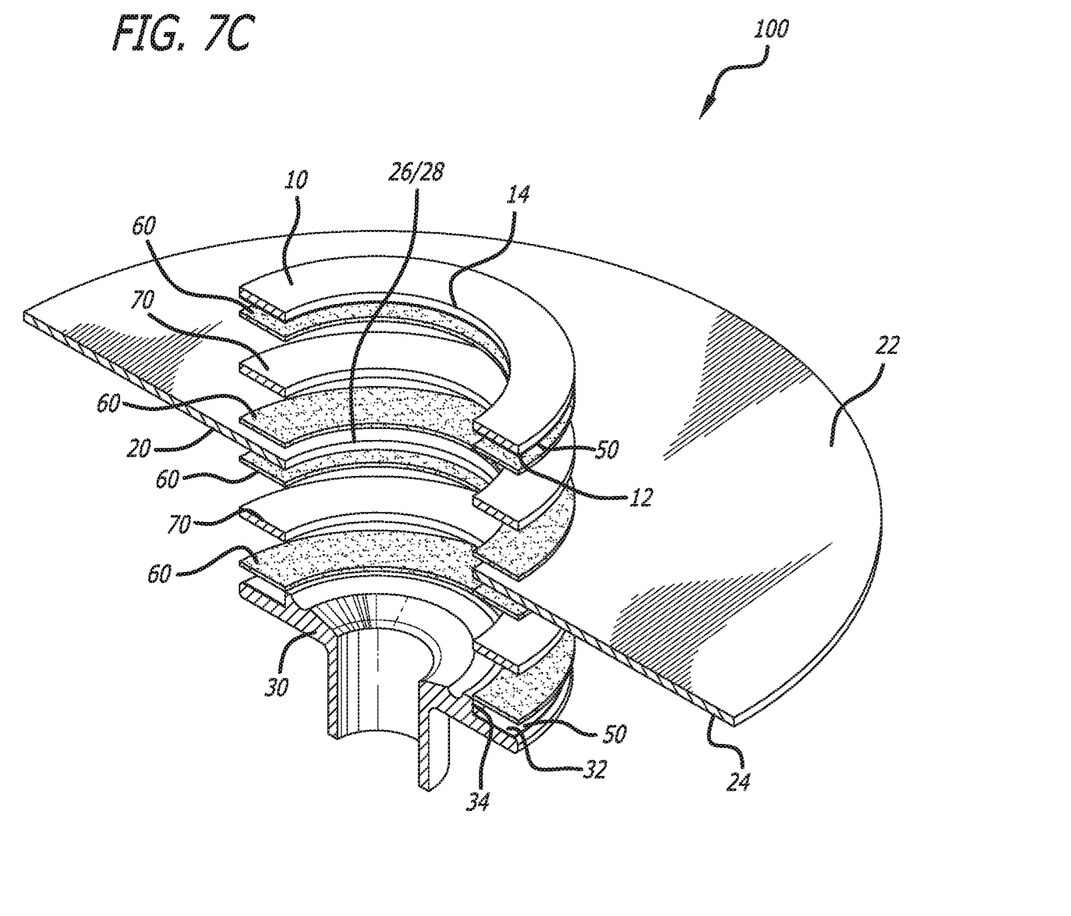
FIG. 7C is an exploded, perspective view of a cross section of FIG. 7A.

With continued reference to FIGS. 7A-7C, in one embodiment, the apparatus 100 can comprise a first metal fitting 10 bonded to a first surface 22 of the polyurethane structure 20 as well as a second metal fitting 30 bonded to a second surface 24 of the polyurethane structure 20. In some embodiments the first metal fitting 10 and the second metal fitting 30 can be different. For example, the first metal fitting 10 might be a fitting ring and the second metal fitting 30 might be a fitting port.

Figure 8:
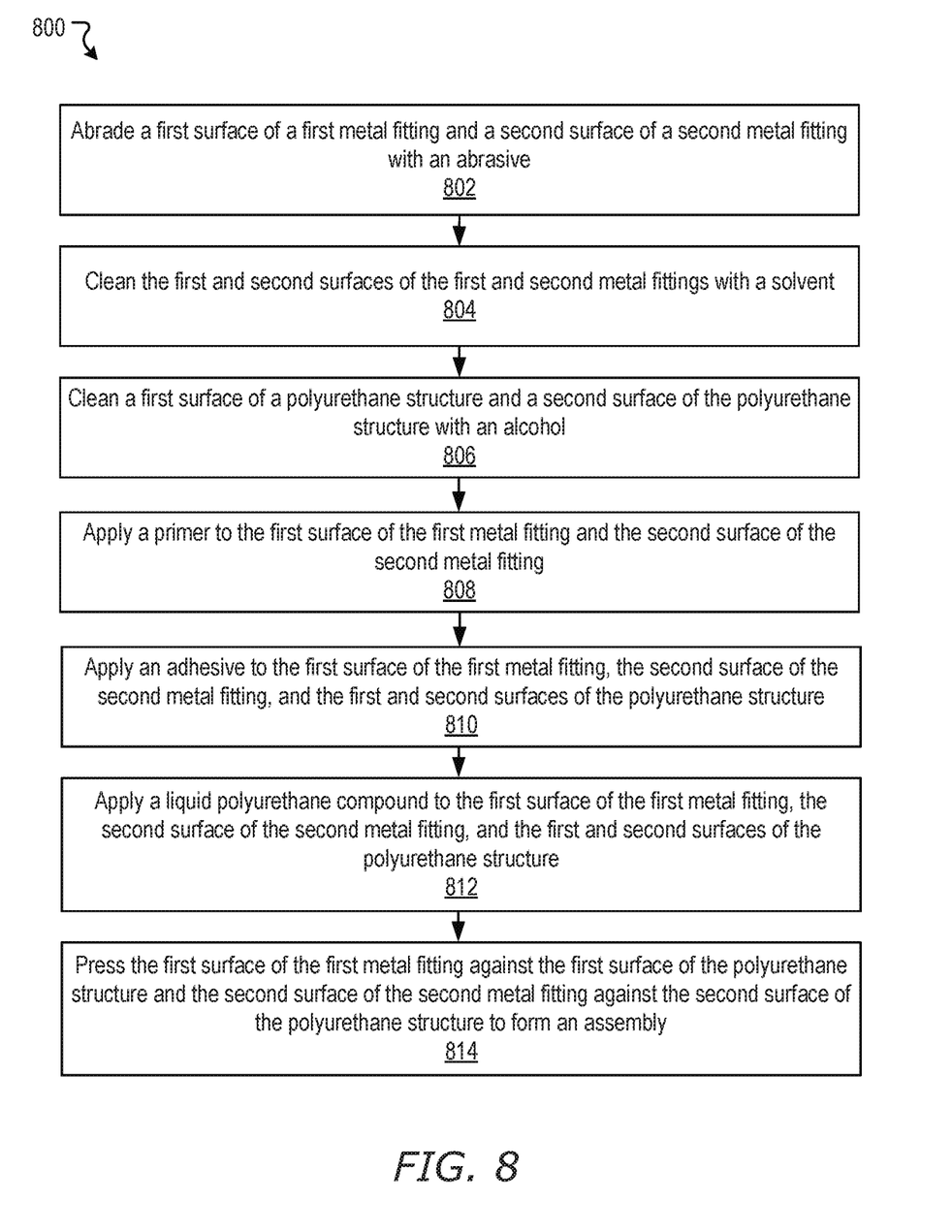
FIG. 8 illustrates an example method of bonding metal fittings to a polyurethane structure in accordance with one embodiment.

With reference now to FIG. 8, there is shown method 800 of bonding the metal fittings 10, 30 to the polyurethane structure 20. At block 802, the method 800 can comprise abrading the first surface 12 of the first metal fitting 10 and the second surface 32 of the second metal fitting 30 with an abrasive (not shown). As described above, the abrading 802 can comprise abrasive blasting. In one embodiment, the abrasive can comprise 24 grit aluminum oxide. In another embodiment, the abrading 802 can comprise masking the metal fittings 10, 30 with tape to cover areas of the fittings that are not to be abraded.

At block 804, the method 800 can comprise cleaning the first and second metal fittings 10, 30 with a solvent (not shown). For example, after the metal fittings 10, 30 are ablated, the metal fittings 10, 30 can be brushed with MEK to remove loose particles from the ablated metal fittings 10, 30. In one embodiment, the metal fittings 10, 30 can be dipped in MEK for about 3-5 minutes and then dried with a clean cloth.

At block 806, the method 800 can comprise cleaning the first surface 22 of the polyurethane structure 20 and the second surface 24 of the polyurethane structure 20 with an alcohol to remove contaminates.

At block 808, the method 800 can comprise applying a primer 50 to the first surface 12 of the first metal fitting 10 and the second surface 32 of the second metal fitting 30. As described above, the primer 50 can comprise a first resin and a first catalyst in a ratio of about 1.1 to 1. In one embodiment, the first resin can comprise from about 40% to about 70%, by weight, methyl ethyl ketone; from about 10% to about 30%, by weight, isopropyl alcohol; from about 10% to about 30%, by weight, trizinc bis(orthophosphate); from about 1% to about 5%, by weight, phenol; and from about 1% to about 5%, by weight, methanol. In another embodiment, the first catalyst can comprise from about 40% to about 70%, by weight, ethyl acetate; from about 10% to about 30%, by weight, isopropyl alcohol; and from about 1% to about 5%, by weight, phosphoric acid. In a further embodiment, the first resin and the first catalyst can be mixed thoroughly in a container and then brushed on to the cleaned and ablated surfaces 12, 32 of the metal fittings 10, 30. In yet another embodiment, the method can further comprise allowing the primer 50 to dry for at least 10 minutes.

At block 810, the method 50 can comprise applying an adhesive 60 to the first surface 12 of the first metal fitting 10, the second surface 32 of the second metal fitting 30, and the first and second surfaces 22, 24 of the polyurethane structure 20. As described above, the adhesive 60 can comprise a second resin and a second catalyst in a ratio of about 3 to 1. In one embodiment, the second resin can comprise from about 50% to about 60%, by weight, methyl ethyl ketone; and from about 15% to about 40%, by weight, bisphenol A diglycidyl ether. In another embodiment, the second catalyst can comprise from about 70% to about 80%, by weight, methyl ethyl ketone; and from about 1% to about 5%, by weight, 4,4-diphenylmethane diisocyanate. In a further embodiment, the second resin and the second catalyst can be mixed thoroughly in a container and then brushed on to the primed, cleaned, and ablated surfaces 12, 32 of the metal fittings 10, 30, as well as the cleaned surfaces 22, 24 of the polyurethane structure 20. In yet another embodiment, the method can further comprise allowing the adhesive 60 to dry for no more than 10 minutes.

At block 812, the method 800 can comprise applying a liquid polyurethane compound 70 to the first surface 12 of the first metal fitting 10, the second surface 32 of the second metal fitting 30, and the first and second surfaces 22, 24 of the polyurethane structure 20. As described above, the liquid polyurethane compound 70 can comprise a third resin and a third catalyst in a ratio of about 10 to 1. In one embodiment, the third resin can comprise from about 0.1% to about 1%, by weight, toluene diisocyanate. In another embodiment, the third catalyst can comprise from about 65% to about 85%, by weight, di(methylthio)toluenediamine; and from about 15% to about 35%, by weight, glycol ether. In a further embodiment, the third resin and the third catalyst can be mixed thoroughly in a container and then brushed on to the surfaces 12, 24 of the metal fittings 10, 32 and the surfaces 22, 24 of the polyurethane structure 20. In an additional embodiment, the liquid polyurethane compound 70 can be applied to the surfaces 12, 32 of the metal fittings 10, 30 and the surfaces 22, 24 of the polyurethane structure 20 while the surfaces 12, 22, 24, 32 remain tacky from the adhesive 60.

At block 814, the method 800 can comprise pressing the first surface 12 of the first metal fitting 10 against the first surface 22 of the polyurethane structure 20 and the second surface 32 of the second metal fitting 30 against the second surface 24 of the polyurethane structure 20 to form an assembly 100. With reference again to FIG. 7C, in one embodiment, the pressing step 814 can comprise aligning the first surface 22 of the polyurethane structure 20 over the first surface 12 of the first metal fitting 10, matching an inner diameter 28 of a die cut hole 26 in the polyurethane structure 20 with an inner diameter 14 of the first metal fitting 10, and pressing the first surface 12 of the first metal fitting 10 onto the first surface 22 of the polyurethane structure 20. In another embodiment, the pressing step 814 can further comprise aligning the second surface 24 of the polyurethane structure 20 over the second surface 32 of the second metal fitting 30, matching the inner diameter 28 of the die cut hole 26 in the polyurethane structure 20 with the inner diameter 34 of the second metal fitting 30, and pressing the second surface 32 of the second metal fitting 30 onto the second surface 24 of the polyurethane structure 20.

With reference again to FIG. 1, in one embodiment, the method can further comprise applying the adhesive 60 to an outer perimeter 40 of the assembly 100. In another embodiment, the method can further comprise applying a bead 42 of the liquid polyurethane compound 70 around the outer perimeter 40 of the assembly 100. In a further embodiment, the bead 42 can be applied with an air-powered fluid dispenser such as a Nordson Air Injection dispenser.

As described above, the polyurethane structure 20 can be a bladder 80, such as a fuel bladder. However, in some embodiments, the polyurethane structure 20 can be a patch. For these embodiments, the method can further comprise heat sealing the patch to the bladder 80.

It should be appreciated from the foregoing description that the present invention provides an improved method of bonding metal fittings to a polyurethane structure. The resulting apparatus provides an improved bond that is able to withstand extreme changes in pressure and temperature. As such, the system and methods described in this application are ideal for use with fuel bladder systems in unmanned aerial vehicles.

Specific methods, devices, and materials are described, although any methods and materials similar or equivalent to those described can be used in the practice or testing of the present embodiment. Unless defined otherwise, all technical and scientific terms used in this application have the same meanings as commonly understood by one of ordinary skill in the art to which this embodiment belongs. The terms "a," "an," and "at least one" encompass one or more of the specified element. That is, if two of a particular element are present, one of these elements is also present and thus "an" element is present. The terms "a plurality of" and "plural" mean two or more of the specified element. The term "or" used between the last two of a list of elements means any one or more of the listed elements. For example, the phrase "A, B, or C" means "A, B, and/or C," which means "A," "B," "C," "A and B," "A and C," "B and C," or "A, B, and C." The term "coupled" generally means physically coupled or linked and does not exclude the presence of intermediate elements between the coupled items absent specific contrary language.

Without further elaboration, it is believed that one skilled in the art, using the proceeding description, can make and use the present invention to the fullest extent. The invention has been described in detail with reference only to the presently preferred embodiments. Persons skilled in the art will appreciate that various modifications can be made without departing from the invention. Accordingly, the invention is defined only by the following claims.

The invention claimed is:

1. A method of bonding a metal fitting to a polyurethane structure, the method comprising:
    abrading a surface of the metal fitting with an abrasive;
    cleaning the metal fitting with a solvent;
    cleaning a surface of the polyurethane structure with an alcohol;
    applying a primer to the surface of the metal fitting, wherein the primer comprises a first resin and a first reactant in a weight ratio of about 1.1 to 1;
    applying an adhesive to the surface of the metal fitting and the surface of the polyurethane structure, wherein the adhesive comprises a second resin and a second reactant in a weight ratio of about 3 to 1;
    applying a liquid polyurethane compound to the surface of the metal fitting and the surface of the polyurethane structure, wherein the liquid polyurethane compound comprises a third resin and a third reactant in a weight ratio of about 10 to 1; and
    pressing the surface of the metal fitting against the surface of the polyurethane structure to form an assembly;
    wherein the first resin comprises
        from about 40% to about 70%, by weight, methyl ethyl ketone,
        from about 10% to about 30%, by weight, isopropyl alcohol,
        from about 10% to about 30%, by weight, trizinc bis(orthophosphate),
        from about 1% to about 5%, by weight, phenol, and
        from about 1% to about 5%, by weight, methanol;
    wherein the first reactant comprises
        from about 40% to about 70%, by weight, ethyl acetate,
        from about 10% to about 30%, by weight, isopropyl alcohol, and
        from about 1% to about 5%, by weight, phosphoric acid;
    wherein the second resin comprises
        from about 50% to about 60%, by weight, methyl ethyl ketone, and
        from about 15% to about 40%, by weight, bisophenol A diglycidyl ether;
    wherein the second reactant comprises
        from about 70% to about 80%, by weight, methyl ethyl ketone, and
        from about 1% to about 5%, by weight, 4,4-diphenylmethane diisocyanate;
    wherein the third resin comprises from about 0.1% to about 1%, by weight, toluene diisocyanate; and
    wherein the third reactant comprises
        from about 65% to about 85%, by weight, di(methylthio)toluenediamine, and
        from about 15% to about 35%, by weight, glycol ether.

2. The method of claim 1, wherein the metal fitting comprises milled aluminum.

3. The method of claim 1, wherein the abrading comprises abrasive blasting.

4. The method of claim 1, wherein the abrasive comprises 24 grit aluminum oxide.

5. The method of claim 1, wherein the solvent comprises methyl ethyl ketone.

6. The method of claim 1, further comprising applying the adhesive to an outer perimeter of the assembly.

7. The method of claim 6, further comprising applying a bead of the liquid polyurethane compound around the outer perimeter of the assembly.

8. The method of claim 7, wherein the bead is applied with an air-powered fluid dispenser.

9. The method of claim 1, further comprising allowing the primer to dry for at least 10 minutes.

10. The method of claim 1, further comprising allowing the adhesive to dry for no more than 10 minutes.

11. The method of claim 1, wherein the metal fitting is selected from the group consisting of: a fitting port, a hatch frame, and a ring.

12. The method of claim 1, wherein:
the polyurethane structure is a patch; and
the method further comprises heat sealing the patch to a bladder.

13. The method of claim 1, wherein the polyurethane structure is a bladder.

14. The method of claim 1, wherein the pressing step comprises:
aligning the surface of the polyurethane structure over the surface of the metal fitting;
matching an inner diameter of a die cut hole in the polyurethane structure with an inner diameter of the metal fitting; and
pressing the surface of the metal fitting onto the surface of the polyurethane structure.

15. A method of bonding metal fittings to a polyurethane structure, the method comprising:
abrading a first surface of a first metal fitting and a second surface of a second metal fitting with an abrasive;
cleaning the first and second metal fittings with a solvent;
cleaning a first surface of the polyurethane structure and a second surface of the polyurethane structure with an alcohol;
applying a primer to the first surface of the first metal fitting and the second surface of the second metal fitting, wherein the primer comprises a first resin and a first reactant in a weight ratio of about 1.1 to 1;
applying an adhesive to the first surface of the first metal fitting, the second surface of the second metal fitting, and the first and second surfaces of the polyurethane structure, wherein the adhesive comprises a second resin and a second reactant in a weight ratio of about 3 to 1;
applying a liquid polyurethane compound to the first surface of the first metal fitting, the second surface of the second metal fitting, and the first and second surfaces of the polyurethane structure, wherein the liquid polyurethane compound comprises a third resin and a third reactant in a weight ratio of about 10 to 1; and
pressing the first surface of the first metal fitting against the first surface of the polyurethane structure and the second surface of the second metal fitting against the second surface of the polyurethane structure to form an assembly;
wherein the first resin comprises
from about 40% to about 70%, by weight, methyl ethyl ketone,
from about 10% to about 30%, by weight, isopropyl alcohol,
from about 10% to about 30%, by weight, trizinc bis(orthophosphate),
from about 1% to about 5%, by weight, phenol, and
from about 1% to about 5%, by weight, methanol;
wherein the first reactant comprises
from about 40% to about 70%, by weight, ethyl acetate,
from about 10% to about 30%, by weight, isopropyl alcohol, and
from about 1% to about 5%, by weight, phosphoric acid;
wherein the second resin comprises
from about 50% to about 60%, by weight, methyl ethyl ketone, and
from about 15% to about 40%, by weight, bisophenol A diglycidyl ether;
wherein the second reactant comprises
from about 70% to about 80%, by weight, methyl ethyl ketone, and
from about 1% to about 5%, by weight, 4,4-diphenylmethane diisocyanate;
wherein the third resin comprises from about 0.1% to about 1%, by weight, toluene diisocyanate; and
wherein the third reactant comprises
from about 65% to about 85%, by weight, di(methylthio)toluenediamine, and
from about 15% to about 35%, by weight, glycol ether.

16. The method of claim 15, wherein the first and second metal fittings comprise milled aluminum.

17. The method of claim 15, wherein the abrading comprises abrasive blasting.

18. The method of claim 15, wherein the abrasive comprises 24 grit aluminum oxide.

19. The method of claim 15, wherein the solvent comprises methyl ethyl ketone.

20. The method of claim 15, further comprising applying the adhesive to an outer perimeter of the assembly.

* * * * *